US011372451B2

(12) United States Patent
He et al.

(10) Patent No.: US 11,372,451 B2
(45) Date of Patent: Jun. 28, 2022

(54) DISPLAY SUBSTRATE, DISPLAY DEVICE AND METHOD OF FORMING DISPLAY SUBSTRATE

(71) Applicant: BOE TECHNOLOGY GROUP CO., LTD., Beijing (CN)

(72) Inventors: Jiayu He, Beijing (CN); Xue Liu, Beijing (CN); Hehe Hu, Beijing (CN); Zhengliang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 82 days.

(21) Appl. No.: 16/900,647

(22) Filed: Jun. 12, 2020

(65) Prior Publication Data

US 2020/0409419 A1    Dec. 31, 2020

(30) Foreign Application Priority Data

Jun. 27, 2019 (CN) .......................... 201910567567.X

(51) Int. Cl.
    *G09F 9/30*      (2006.01)
    *G06F 1/16*      (2006.01)
    *G06F 1/18*      (2006.01)

(52) U.S. Cl.
    CPC ............ *G06F 1/1652* (2013.01); *G06F 1/189* (2013.01); *G09F 9/301* (2013.01)

(58) Field of Classification Search
    CPC ... G09F 9/30; G09F 9/301; G06F 1/16; G06F 1/1652; G06F 1/18; G06F 1/189;

(Continued)

(56) References Cited

U.S. PATENT DOCUMENTS 9,799,708 B2 * 10/2017 Hong ................. H01L 51/0097
2011/0199284 A1 * 8/2011 Davis .................... G01L 5/0042
                                                  73/778

(Continued)

FOREIGN PATENT DOCUMENTS

CN         108461531 A      8/2018
CN         109671719 A      4/2019

(Continued)

OTHER PUBLICATIONS

State Intellectual Property Office of the People's Republic of China, Office Action and Search Report Issued in Application No. 201910567567.X, dated Jan. 6, 2021, 18 pages. (Submitted with Partial Translation).

(Continued)

*Primary Examiner* — Joe H Cheng
(74) *Attorney, Agent, or Firm* — McCoy Russell LLP

(57) ABSTRACT

A display substrate, a display device, and a method of forming a display substrate are provided. The display substrate includes: a flexible base substrate and a plurality of pixel islands arranged on the flexible base substrate, where the plurality of pixel islands are arranged in an array, two adjacent pixel islands are connected through an island bridge, display units are arranged on the pixel islands, the display units on the pixel islands are electrically connected through an inter-island connection line arranged on the island bridge, a region outside the pixel islands and the island bridge is a hollow area, and axes of four island bridges around the hollow area are arranged as a parallelogram.

18 Claims, 8 Drawing Sheets

(58) Field of Classification Search
CPC ............. H01L 27/3244; H01L 27/3258; H01L 27/3276; H01L 2227/323
See application file for complete search history.

(56) References Cited

U.S. PATENT DOCUMENTS

| | | | |
|---|---|---|---|
| 2014/0118292 A1* | 5/2014 | Kim | G06F 3/0443 216/13 |
| 2016/0190389 A1* | 6/2016 | Lee | H01L 27/1255 257/93 |
| 2016/0211483 A1* | 7/2016 | Kwon | H01L 27/3276 |
| 2017/0249886 A1* | 8/2017 | Choi | H05K 1/0283 |
| 2017/0278920 A1* | 9/2017 | Park | H01L 27/3293 |
| 2018/0095584 A1* | 4/2018 | Lee | H01L 51/5203 |
| 2018/0358413 A1* | 12/2018 | Lee | H01L 27/323 |
| 2019/0369784 A1* | 12/2019 | Yao | G06F 3/0412 |
| 2020/0027940 A1* | 1/2020 | Wang | H01L 51/52 |
| 2020/0243778 A1* | 7/2020 | Li | H01L 27/3276 |
| 2020/0303467 A1* | 9/2020 | Feng | H01L 27/323 |

FOREIGN PATENT DOCUMENTS

| | | |
|---|---|---|
| CN | 109755412 A | 5/2019 |
| CN | 109830505 A | 5/2019 |
| CN | 109830509 A | 5/2019 |
| CN | 109841660 A | 6/2019 |
| CN | 109860242 A | 6/2019 |

OTHER PUBLICATIONS

Crawford, G., "Flexible Flat Panel Displays," John Wiley & Sons, West Sussex, England, Jun. 17, 2005, 6 pages.
State Intellectual Property Office of the People's Republic of China, Office Action and Search Report Issued in Application No. 201910567567.X, dated Aug. 10, 2021, 20 pages. (Submitted with Partial Translation).

* cited by examiner

DISPLAY SUBSTRATE, DISPLAY DEVICE AND METHOD OF FORMING DISPLAY SUBSTRATE

CROSS-REFERENCE TO RELATED APPLICATIONS

The present application claims priority to Chinese Patent Application No. 201910567567.X filed on Jun. 27, 2020. The entire contents of the above-listed application is hereby incorporated by reference for all purposes.

TECHNICAL FIELD

The present disclosure relates to field of display technologies, and more particularly, to a display substrate, a display device, and a method of forming a display substrate.

BACKGROUND

In recent years, flexible, stretchable display panels have been increasingly of interest. During the stretching of the display panel, the length of the display panel in the stretching direction increases, and the length perpendicular to the stretching direction decreases to a certain extent. This deformation may cause stress concentration of the display panel locally, thereby causing damage to the display panel.

SUMMARY

In a first aspect, a display substrate is provided in some embodiments of the present disclosure, including: a flexible base substrate and a plurality of pixel islands arranged on the flexible base substrate, where the plurality of pixel islands are arranged in an array, two adjacent pixel islands are connected through an island bridge, display units are arranged on the pixel islands, the display units on the pixel islands are electrically connected through an inter-island connection line arranged on the island bridge, a region outside the pixel islands and the island bridge is a hollow area, and axes of four island bridges around the hollow area are arranged as a parallelogram.

Optionally, a width of each island bridge gradually increases in a direction from a center of the island bridge toward the pixel island.

Optionally, a side edge of each island bridge is arc-shaped and connected to the pixel island in a tangential direction of the pixel island.

Optionally, a central angle, corresponding to a portion of the pixel island connected to the island bridge, is 60 degrees to 80 degrees.

Optionally, in the four island bridges whose axes are arranged as the parallelogram, an included angle between the axes of two adjacent ones of the island bridges is greater than 30 degrees and less than 90 degrees, or greater than 90 degrees and less than 150 degrees.

Optionally, the inter-island connection line is arranged in a same layer as a signal line of each display unit.

Optionally, the island bridge includes a first planarization layer and a second planarization layer arranged at a side of the first planarization layer away from the flexible base substrate, the inter-island connection line is arranged between the first planarization layer and the second planarization layer.

Optionally, an elastic modulus of the first planarization layer and an elastic modulus of the second planarization layer are both smaller than an elastic modulus of the inter-island connection line.

Optionally, axial directions of part of the island bridges are the same as an extension direction of a gate line of the display substrate or the same as an extension direction of a scanning line of the display substrate.

Optionally, a side edge of each island bridge is arc-shaped and connected to the pixel island in a tangential direction of the pixel island.

Optionally, two opposite ends of the island bridge are respectively connected to the two adjacent pixel islands, and the width of the island bridge gradually increases in a first direction from a center point of an axis of the island bridge toward one of the two opposite ends of the island bridge and gradually increases in a second direction from the center point of the axis of the island bridge toward the other one of the two opposite ends of the island bridge, where the first direction is opposite to the second direction.

Optionally, a central angle, corresponding to a part of the side edge of each pixel island which is in contact with and connected to the island bridge, is 60 degrees to 80 degrees.

Optionally, ends at a side of the hollow area, of the side edges of adjacent island bridges which are in contact with and connected to each pixel island, coincide.

In a second aspect, a display device including the display substrate hereinabove is further provided in some embodiments of the present disclosure In a third aspect, a method of forming a display substrate is further provided in some embodiments of the present disclosure, including:

providing a flexible base substrate;

forming a plurality of pixel islands on the flexible base substrate, and forming a plurality of island bridges on the flexible base substrate, where the plurality of pixel islands are arranged in an array, two adjacent pixel islands are connected through the island bridges, a region outside the pixel islands and the island bridges is a hollow area, and axes of the four island bridges surrounding the same hollow area are arranged as a parallelogram; and forming display units on the pixel islands, and forming an inter-island connection line on each island bridge, where the display units are electrically connected to each other through the inter-island connection line.

Optionally, the forming the plurality of pixel islands on the flexible base substrate and forming the plurality of island bridges on the flexible base substrate further includes:

forming a barrier layer, a buffer layer, an active layer, a gate insulating layer, a gate layer and a dielectric layer on the flexible base substrate, where the active layer is arranged in a region corresponding to the pixel islands;

forming grooves in regions corresponding to the island bridges and the hollow area; and filling, with an organic material, the grooves in the regions corresponding to the island bridges.

Optionally, the forming the grooves in the regions corresponding to the island bridges and the hollow area further includes:

forming first grooves in the regions corresponding to the island bridges and the hollow area, where the first grooves extend from the dielectric layer to the barrier layer;

forming a second groove in the region corresponding to the hollow area, where the second groove extends from the barrier layer to a surface of the flexible base substrate.

Optionally, each display unit includes a signal line, the forming the display units on the pixel islands and forming the inter-island connection line on each island bridge further includes:

forming the signal line on each pixel island and the inter-island connection line on each island bridge by one patterning process.

BRIEF DESCRIPTION OF THE DRAWINGS

In order that the technical solution of the embodiments of the present disclosure may be more clearly described, the drawings required for describing the embodiments of the present disclosure will be briefly described. It will be apparent that the drawings in the following description are merely some of the embodiments of the present disclosure, and other drawings may be obtained by those of ordinary skill in the art without creative work.

DETAILED DESCRIPTION

The technical solution in the embodiments of the present disclosure will be described more clearly and completely below in connection with the accompanying drawings in the embodiments of the present disclosure, and it will be apparent that the described embodiments are a part, but not all, of the embodiments of the present disclosure. Based on the embodiments in the present disclosure, all other embodiments obtained by a person of ordinary skill in the art without creative work are within the scope of the present disclosure.

A display substrate is provided in some embodiments of the present disclosure.

Figure 1:
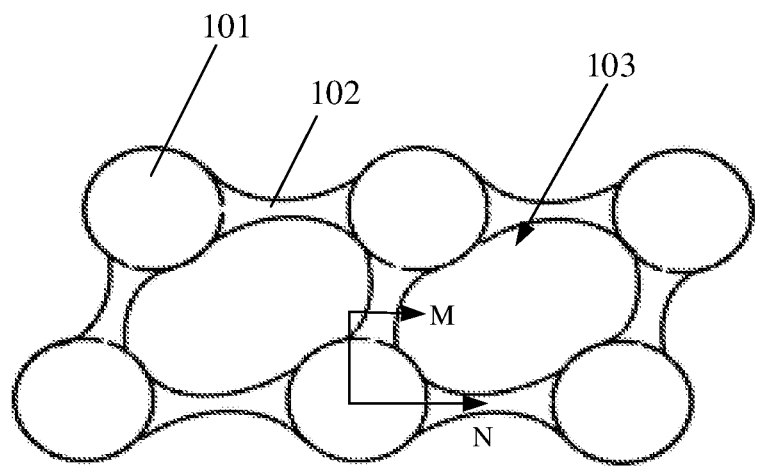
FIG. 1 is a schematic view of a display substrate in some embodiments of the present disclosure.

As shown in FIG. 1, the display substrate includes a flexible base substrate, a plurality of pixel islands 101 arranged on the flexible base substrate, the plurality of pixel islands 101 are arranged in an array, and two adjacent pixel islands 101 are connected through an island bridge 102.

The hollow area 103 between the pixel island 101 and the island bridge 102 connecting each pixel island 101 is also understood to be a portion of the functional film layer removed from the display substrate, so that a plurality of grooves are formed in the display substrate.

In the regions corresponding to these grooves, one part of the regions only remains the flexible base substrate and the other functional film layers thereon are removed, this part of regions forms the hollow area 103. Another part of the regions not only remains the flexible base substrate but also some other functional film layer, such as a planarization layer, and this part of regions forms the island bridge 102. The portions without the groves form the pixel islands 101.

Further, a display unit is formed on the pixel island 101, and an inter-island connection line 415B is formed on the island bridge 102, to electrically connect the display units on respective pixel islands 101 through the inter-island connection line 415B on the island bridge 102.

The axes of the four island bridges 102 around the same hollow area 103 are arranged as a parallelogram.

The flexible base substrate in this embodiment may be a flexible base substrate in the related art. In the implementation, a material having a high elastic modulus and an elongation at break should be applied to ensure that the display substrate has a good stretching effect. In one embodiment, the elastic elongation of the selected flexible base substrate is not less than 32%, and the elongation at break thereof is not less than 257%, thereby achieving a better stretching effect.

Each pixel island 101 may be provided with a display unit, and the number of pixels on the pixel island 101 may be one or more. The display unit may be a Quantum Dot Light Emitting Diodes (QLED) display unit, a Micro LED (micro-diode) display unit, a Mini LED (mini-diode) display unit, or the like. In some embodiments of the present disclosure, the display unit is an Organic Light-Emitting Diode (OLED) as an example. It is obvious that other types of display units may be applicable, and a specific structure thereof may also be described with reference to the related art, which is not limited and described herein.

As shown in FIG. 1, in some embodiments of the present disclosure, four pixel islands 101 are arranged around the periphery of each hollow area 103, and two adjacent pixel islands 101 are connected through an island bridge 102. It is understood that each pixel island 101 is located at four vertices of the parallelogram structure, and the axis of each island bridge 102 is located at four sides of the parallelogram.

Figure 2:
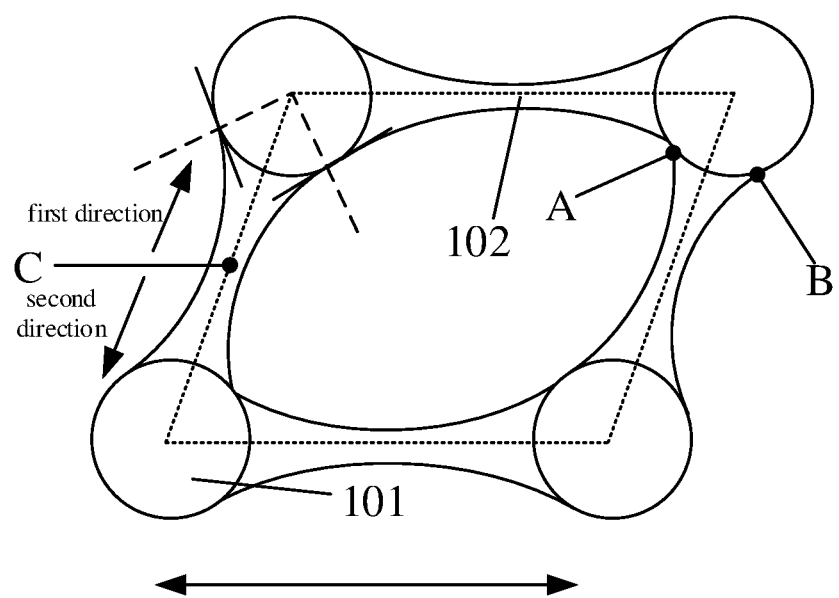
FIG. 2 is a schematic view of a display substrate in some embodiments of the present disclosure.

The axis of the island bridge 102 refers to the geometrically central axis of the island bridge 102. As shown in FIG. 2, the axis of the island bridge 102 may also be understood as a connection line between the centers of two pixel islands 101 connected through one island bridge 102.

When the display substrate is subjected to a tensile force, the parallelogram structure is deformed. Specifically, the parallelogram structure is extended in the direction of the tensile force and narrowed in the direction perpendicular to the tensile force. Since the axes of the island bridges 102 are arranged as a parallelogram, that is, the axes of the island bridges 102 are substantially straight, the possibility of stress concentration on the island bridges 102 is also reduced.

The island and island bridge 102 on the display substrate are arranged as a parallelogram distribution in some embodiments of the present disclosure. With the instability of the parallelogram, the parallelogram structure of the island and the island bridge 102 may be deformed to accommodate the stretching when the island and the island bridge 102 are stretched, thereby reducing the possibility of stress concentration, and reducing the possibility of damage of the display substrate.

Optionally, as shown in FIGS. 1 and 2, a width of each island bridge 102 gradually increases in a direction from a center of the island bridge 102 toward the pixel island 101.

Specifically, as shown in FIG. 2, two opposite ends of the island bridge 102 are connected to the two adjacent pixel islands 101, and the width of the island bridge 102 gradually increases in a first direction from a center point C of an axis of the island bridge 102 toward one of the two opposite ends of the island bridge 102 and gradually increases in a second direction from the center point C of the axis of the island bridge toward the other one of the two opposite ends of the island bridge 102, where the first direction is opposite to the second direction.

Since the axis of the island bridge 102 is substantially straight, when the island bridge 102 is deformed, the stress concentration occurs at the end of the island bridge 102. By increasing the width of the end of the island bridge 102, the stress at the island bridge 102 may be reduced, the stress density may be reduced, and the possibility of damage to the display substrate may be reduced.

Optionally, a side edge of each island bridge 102 are arc-shaped and connected to the pixel island 101 in the tangential direction of the pixel island 101.

Referring to FIG. 2, when the display substrate shown in FIG. 2 is subjected to a transverse tension (i.e., in the direction of double arrows), a slight deformation occurs. In this case, taking the island bridge 102 shown in FIG. 2 as an example, the stress concentration occurs at points A and B shown in the figure, where point A is the stress concentration caused by the pressure, and point B is the stress concentration caused by the tension. That is, the stress concentration is most likely to occur on both sides of both ends of the island bridge 102.

As shown in FIG. 2, a side edge of each island bridge 102 are arc-shaped and connected to the pixel island 101 in the tangential direction of the pixel island 101, which means that at the intersection of the pixel island 101 and the island bridge 102, the tangential direction of the island bridge 102 coincides with the tangential direction of the pixel island 101, and are both a solid line tangent to the pixel island 101 in the upper left corner in FIG. 2.

As shown in FIG. 2, in the two island bridges 102 connected to each pixel island 101, at a side of the hollow areas 103 surrounded by the four island bridges 102, ends of the side edges of adjacent island bridges 102 which are in contact with and connected to each pixel island 102, coincide at the point A.

Since the stress concentration mainly occurs at both ends of the connection portion between the island bridge 102 and the pixel island 101, when the side wall of the island bridge 102 is arc-shaped and connected to the pixel island 101 along the tangential direction of the pixel island 101, the connection strength between the island bridge 102 and the pixel island 101 can be increased, thereby reducing the possibility of structural damage.

In an alternative embodiment, a central angle, corresponding to a part of the side edge of each pixel island 101 which is in contact with and connected to the island bridge 102, is 60 degrees to 80 degrees. It will be understood that the pixel island 101 is substantially circular, the circumference of the pixel island 101 is 360 degrees, and the angle corresponding to the region where the pixel island 101 is connected to the island bridge 102 is 60 degrees to 80 degrees, as shown in FIG. 2, that is, the included angle between the two dotted lines drawn from the center of the upper left corner pixel island 101 is 60 degrees to 80 degrees. That is, the central angle of the pixel island 101, corresponding to the part of edge (the edge between the point A and the point B of the pixel island 101) where the pixel island 101 is in contact with and connected to the island bridge 102, is 60 degrees to 80 degrees. This is equivalent to increasing the length of the connecting portion of the pixel island 101 with the island bridge 102, thereby improving the connection strength.

Optionally, an included angle between the axes of two adjacent island bridges 102 is greater than 30 degrees and less than 90 degrees, or greater than 90 degrees and less than 150 degrees.

Here, two adjacent island bridges 102 refer to two adjacent island bridges 102 in a parallelogram structure. It will be appreciated that in a parallelogram structure in which the four island bridges 102 surrounding the same hollow area 103, i.e. in a parallelogram enclosed by dotted lines in FIG. 2, the smaller inner angle is greater than 30 degrees and less than 90 degrees and the larger inner angle is greater than 90 degrees and less than 150 degrees. This helps to further reduce the stress concentration that may occur when the display substrate is stretched.

Figure 4:
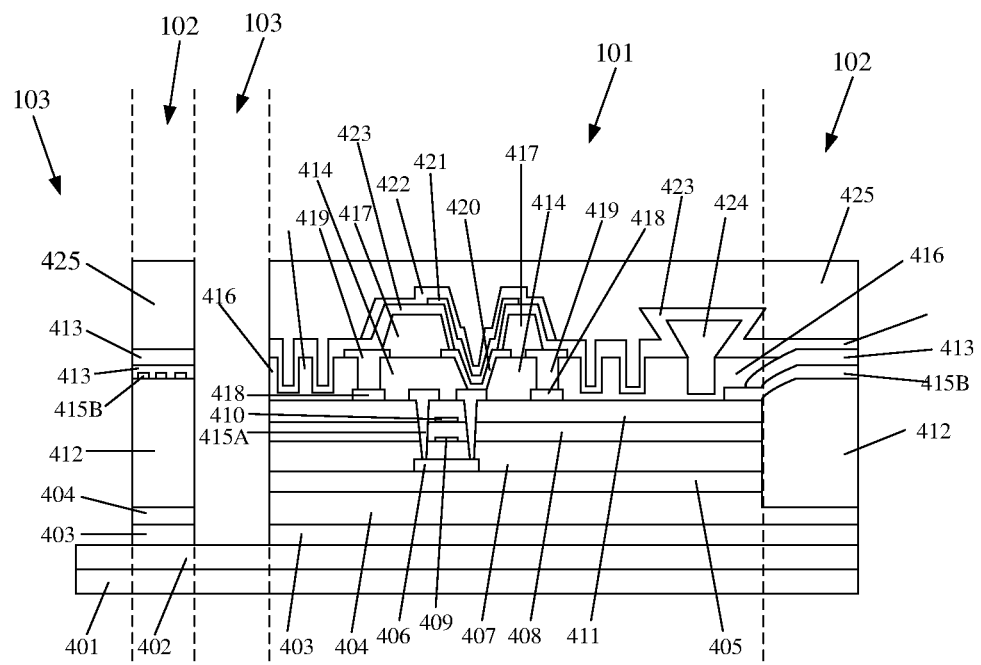
FIG. 4 is a sectional view in the direction M-N in FIG. 1.

Optionally, as shown in FIG. 4, a display unit is provided in the pixel island 101, the display units on two adjacent pixel islands 101 are electrically connected through an inter-island connection line 415B, and a material of the inter-island connection line 415B includes titanium-aluminum-titanium.

The number of the inter-island connection lines 415B may be one or more, and the inter-island connection lines 415B may be specifically configured to electrically connect the display units on the different pixel islands 101, and may be specifically configured to electrically connect, including but not limited to, data lines, scanning lines, power lines, and the like.

The inter-island connection lines 415B may be selected to provide a conductive effect, for example, a single material such as aluminum, copper, or silver, or a composite material in which multiple layers of materials are stacked.

In one embodiment, the material is titanium-aluminum-titanium, wherein the aluminum layer enables electrical connection and ensures a better conductive effect, and the titanium layer ensures that it has sufficient strength to reduce the possibility of damage to the island bridge 102.

In one embodiment, the inter-island connection line 415B is provided at the same material as the signal line of the display unit. As shown in FIG. 4, the signal line is specifically the source and drain electrode layer 415A of the display unit, thereby simplifying the production process.

Optionally, the display substrate further includes a first planarization layer 412 and a second planarization layer 413, and an inter-island connection line 415B is located between the first planarization layer 412 and the second planarization layer 413.

The material of the first planarization layer 412 and the second planarization layer 413 is an insulating material having a lower Young's modulus, and the ductility thereof should be as large as possible under other conditions, so as to improve the stretchability of the island bridge 102 and ensure the stretchability of the structure of the island bridge 102 while achieving an insulating effect.

The metal material of the inter-island connecting line 415B may increase the strength of the island bridge 102, so that the strength and the stretchability of the island bridge 102 are ensured, by the first planarization layer 412, the second planarization layer 413, and the inter-island connecting line 415B.

In addition, the pixel defining layer 417 may be made of the same or similar materials as the first planarization layer 412 and the second planarization layer 413, so as to increase the stretchability of the structure of the pixel island 101.

Optionally, the elastic modulus of both the first planarization layer 412 and the second planarization layer 413 are less than the elastic modulus of the inter-island connection line 415B. Accordingly, the stretchability of the first planarization layer 412 and the second planarization layer 413 is larger than that of the inter-island connection line 415B, so that compared with a material having a large elastic modulus and a small stretchability, the island bridge 102 in some embodiments of the present disclosure has a larger deformation and a smaller stress strength when subjected to a tensile force, thereby further reducing the possibility of structural damage.

Optionally, the axial direction of some of the island bridges 102 is the same as the extension direction of the gate line of the display substrate, or the same as the extension direction of the scanning line.

As shown in FIG. 2, in some embodiments, a group of opposite sides of the parallelogram structure formed by the island bridge 102 is in the transverse or longitudinal direction of the display substrate, so that when the display substrate is subjected to tension in the direction of this set of opposite sides, the set of opposite sides is subjected to an axial force, which helps to reduce the bending moment between the island bridge 102 and the pixel island 101, thereby reducing the possibility of stress concentration.

A display device including the display substrate described hereinabove is further provided in some embodiments of the present disclosure. It will be appreciated that the display device includes at least one display panel, and the display substrate of the display panel is any of the display substrates described above.

Since the technical solution of the present embodiment includes all the technical solutions of the foregoing embodiments, at least all the technical effects can be achieved, and details are not described herein.

A method of forming a display substrate is further provided in some embodiments of the present disclosure, applied to form the display substrate hereinabove.

Figure 3:
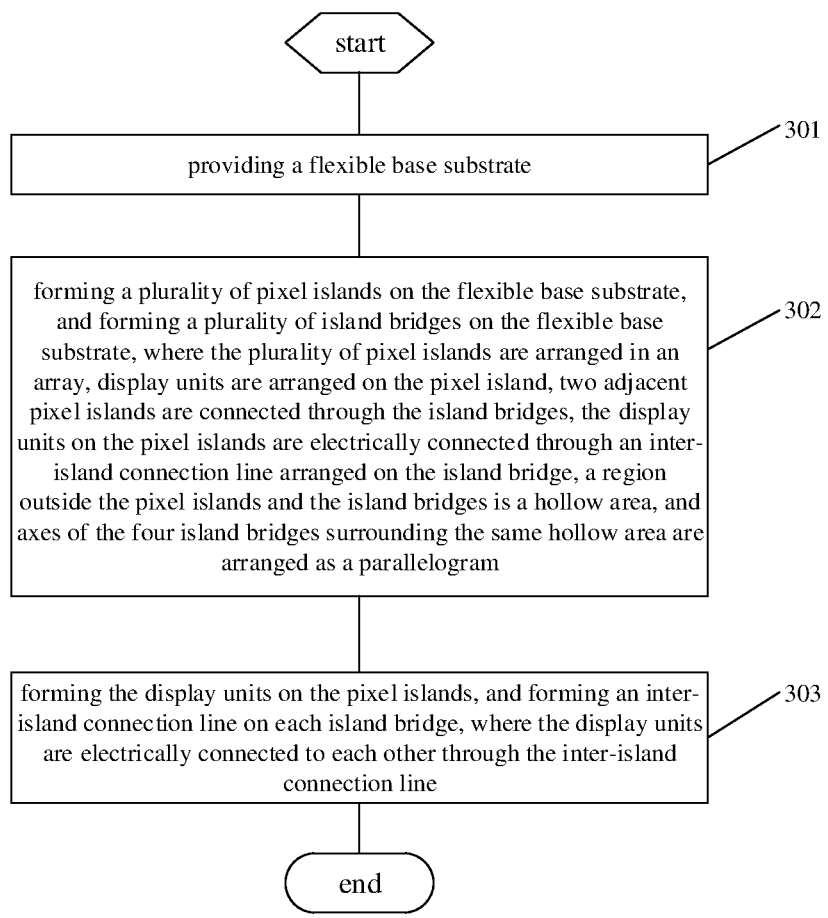
FIG. 3 is a flowchart of a method of forming a display substrate in some embodiments of the present disclosure.

As shown in FIG. 3, the method of forming the display substrate includes the following steps:

Step 301: providing a flexible base substrate.

The flexible base substrate in this embodiment may referred to that in the related art and is not further limited herein. In practice, materials with high modulus of elasticity and elongation at break should be applied to ensure that the display substrate has a good tensile effect.

In one embodiment, the elastic elongation of the applied flexible base substrate is not less than 32%, and the elongation at break thereof is not less than 257%, thereby enabling a better stretching effect.

Step 302: forming a plurality of pixel islands on the flexible base substrate, and forming a plurality of island bridges on the flexible base substrate, where the plurality of pixel islands are arranged in an array, display units are arranged on the pixel island, two adjacent pixel islands are connected through the island bridges, the display units on the pixel islands are electrically connected through an inter-island connection line 415B arranged on the island bridge, a region outside the pixel islands and the island bridges is a hollow area, and axes of the four island bridges surrounding the same hollow area are arranged as a parallelogram.

Step 303: forming the display units on the pixel islands, and forming an inter-island connection line on each island bridge, where the display units are electrically connected to each other through the inter-island connection line.

The display substrate formed in this embodiment is any one of the display substrates in the above-described display substrate embodiment, and the same technical effect can be achieved, and details are not described herein.

The method of forming the display substrate will be described in further detail below.

As shown in FIG. 4, in one embodiment, the display substrate includes a flexible base substrate (Bottom Film) 401, an OCA (OCA) 402, a polyimide layer (PI) 403, a Barrier (Barrier) 404, and a Buffer (Buffer) 405.

The flexible base substrate 401 may be a material having a certain elasticity. Generally, the Young's modulus of the flexible base substrate 401 is not less than 0.003 Gpa, and the elongation thereof should be as high as possible. The optical adhesive used in the optical adhesive layer 402 is an organic material having a certain elasticity, and is mainly configured to increase the adhesion between the flexible base substrate 401 and the polyimide layer 403. The barrier layer 404 is mainly configured to insulate water and oxygen to improve the reliability of the display device. The buffer layer 405 is configured to improve the deposition and crystallization quality of other film layers.

Further, the display substrate further includes an active layer (Active) 406, a first gate insulating layer (GI1) 407, a second gate insulating layer (GI2) 408, a first gate layer (Gate1) 409, a second gate layer (Gate2) 410, a dielectric layer (ILD) 411, a first planarization layer (PLN1) 412, a second planarization layer (PLN2) 413, a third planarization layer (PLN3) 414, and a source and drain electrode layer (SD) 415A.

A first protective layer (SD Cover) 416, a pixel definition layer (PDL) 417, a VSS electrode 418, a transparent electrode layer 419, an anode layer (Anode) 420, an electroluminescent layer (EL) 421, a cathode layer (Cathode) 422, a second protective layer (Anode Cover) 423, a spacer (PS) 424, a thin film encapsulation layer (TFE) 425, and the like.

The transparent electrode layer 419 in this embodiment is electrically connected to the VSS electrode 418. The material of the transparent electrode layer 419 includes ITO (indium tin oxide). It will be appreciated that, in general, the material of the anode layer 420 also includes ITO, which may be, for example, a composite structure of ITO-Ag (silver)-ITO, which has a high work function and is capable of preventing oxidation of Ag, and that the anode layer 420 and the transparent electrode layer 419 may be provided in the same layer of the same material and made by a one-time patterning process.

The arrangement of the functional film layers of the display substrate, the materials selected, the specific preparation process, and the like can be referred to the related art and the improved display substrate. Therefore, the display substrate in the above-described embodiments is not limited to being prepared by the method of preparation.

In one embodiment, step 302 specifically includes:

forming a barrier layer 404, a buffer layer 405, an active layer 406, a gate insulating layer, a gate layer and a dielectric layer 411 on the flexible base substrate, where the gate layer and the active layer 406 are arranged in a region corresponding to the pixel islands.

Figure 5:
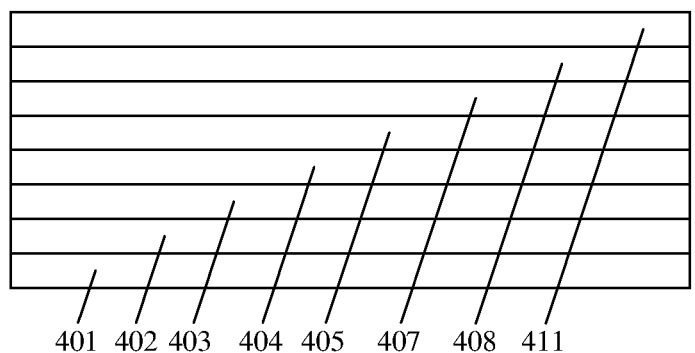
FIG. 5 is a schematic view of a display substrate in some embodiments of the present disclosure.

Specifically, as shown in FIG. 5, an optical adhesive is first applied to the flexible base substrate 401 to form an optical adhesive layer 402, and then a polyimide layer (PI) 403, a barrier layer 404, a buffer layer 405, a first gate insulating layer 407, a second gate insulating layer 408, and a dielectric layer 411 are sequentially formed on the optical adhesive layer 402.

As shown in FIG. 4, the first gate insulating layer 407 and the second gate insulating layer 408 are configured to realize insulation of the gate. It will be appreciated that prior to forming the first gate insulating layer 407, an active layer 406 needs to be formed; prior to forming the second gate insulating layer 408, a first gate layer 406 needs to be formed; and prior to forming the dielectric layer 411, the second gate layer 410 needs to be formed. The forming of these structures is described with reference to the related art, and thus these structures are omitted from FIG. 5 and the drawings, which are not further defined and described herein.

The step 302 further includes: forming grooves in regions corresponding to the island bridges 102 and the hollow area 103.

Figure 6:
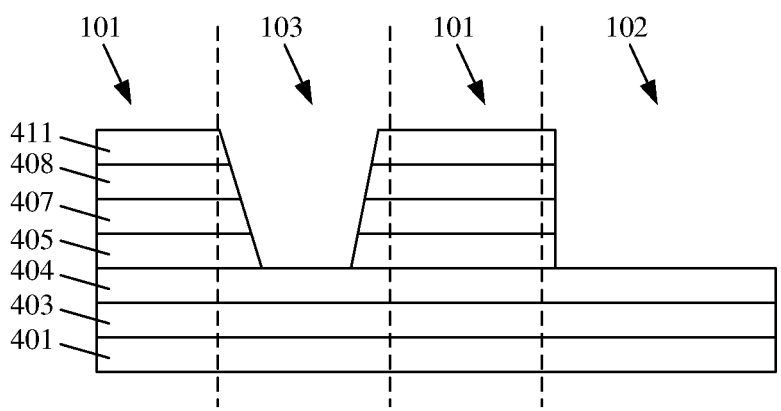
FIG. 6 is a schematic view of a display substrate in some embodiments of the present disclosure.
Figure 7:
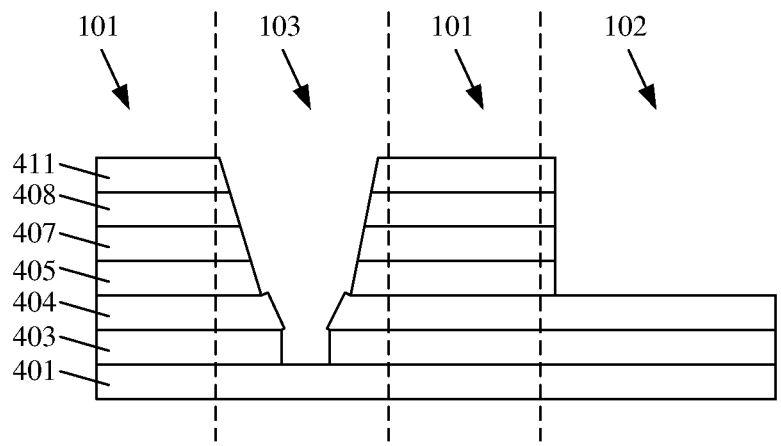
FIG. 7 is a schematic view of a display substrate in some embodiments of the present disclosure.

As shown in FIGS. 6 and 7, the grooves are formed in the display substrate, and an area in which the grooves are formed corresponds to the island bridge 102 and the hollow area 103 of the display substrate, while an area without the groove forms the pixel island 101 of the display substrate.

In some embodiments of the present disclosure, the step of forming the groove comprises:

forming first grooves in the regions corresponding to the island bridges 102 and the hollow area 103, where the first grooves extend from the dielectric layer 411 to the barrier layer 404;

forming a second groove in the region corresponding to the hollow area 103, where the second groove extends from the barrier layer 404 to a surface of the flexible base substrate 401.

Specifically, as shown in FIG. 6, the island bridge 102 and the hollow area 103 are etched, for example by dry etching, and grooves are formed to the barrier layer 404.

The first grooves formed in this step may extend to only one side surface of the barrier layer 404 away from the liner flexible base substrate 401, or a portion of the barrier layer 404 may be removed when the first groove is formed.

For the region corresponding to the hollow area 103, the barrier layer 404 needs to be further removed subsequently, so whether or not the barrier layer 404 is etched out will not be greatly affected. For the area corresponding to the island bridge 102, the barrier layer 404 needs to be remained. The barrier layer 404 is relatively thick, so that the barrier layer 404 cannot be etched away or only a small portion of the barrier layer 404 can be etched away by a conventional etching process, so even if a small portion of the barrier layer 404 is removed, this does not adversely affect the performance of the barrier layer 404.

Referring further to FIG. 7, a groove is formed to the flexible base substrate 401 in a region corresponding to the hollow area 103 by a large-area deep exposure process.

Since the strength of the flexible base substrate 401 is relatively high and the thickness of the flexible base substrate 401 is also relatively large, the etching process has substantially no effect on the flexible base substrate 401, so even if a part of the flexible base substrate 401 is removed during the forming of the second groove, the etching process has no effect on the flexible base substrate 401.

It is also to be understood that in the region corresponding to the hollow-out region 103, only the flexible base substrate 401 is remained, and other film layers on the flexible base substrate 401 are removed. In the region corresponding to the island bridge 102, not only the flexible base substrate 401 is remained, but also some other functional film layers, such as a polyimide layer (PI) 403, a barrier layer 404, and the like, are remained.

It should be understood that the reason for forming the grooves in the hollow area 103 by two times of etching is that, the thickness of the barrier layer 404 is too thick, and the etching of the barrier layer 404 may not be completed once. However, if the etching of the barrier layer 404 can be completed once, the forming of the grooves in the region corresponding to the island bridge 102 and the hollow area 103 may be completed once.

As shown in FIG. 7, the edge of the barrier layer 404 corresponding to the opening of the hollow area 103 in FIG. 7 has some irregular convex structures, which is caused by the exposure process, and the occurrence of the irregular structure should be avoided as much as possible.

At the same time, before forming the other film layers on the flexible base substrate 401, the optical adhesive layer 402 may be formed on the flexible base substrate 401. The optical adhesive layer 402 is a material having a certain elasticity. On the one hand, the adhesion between the other film layers and the flexible base substrate 401 may be improved, and on the other hand, the stretching ability of the display substrate may be improved. The optical adhesive layer 402 is not shown in FIGS. 6 to 15.

The above-described step 302 further includes: filling, with an organic material, the grooves in the regions corresponding to the island bridges 102.

Figure 8:
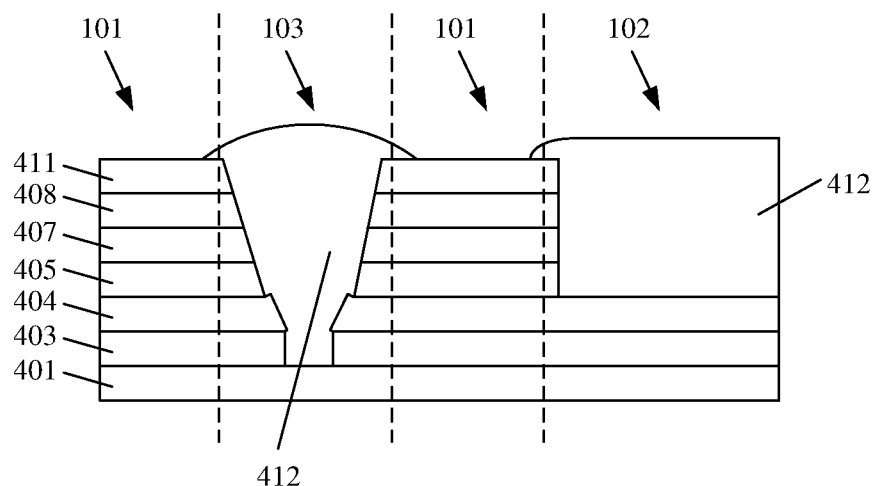
FIG. 8 is a schematic view of a display substrate in some embodiments of the present disclosure.

Referring to FIG. 8, a first planarization layer 412 is then formed at the island bridge 102 and the hollow area 103 where grooves are formed. The first planarization layer 412 functions as a planarization and also as a filling for the formed grooves.

It should be understood that in the step of forming the first planarization layer 412 to fill the grooves, the area corresponding to the island bridge 102 and the area corresponding to the hollow area 102 are simultaneously filled, and the organic material in the grooves of the hollow area 102 can be subsequently removed by an ashing process, so that only the grooves of the area corresponding to the island bridge 102 are finally filled with the organic material.

Figure 9:
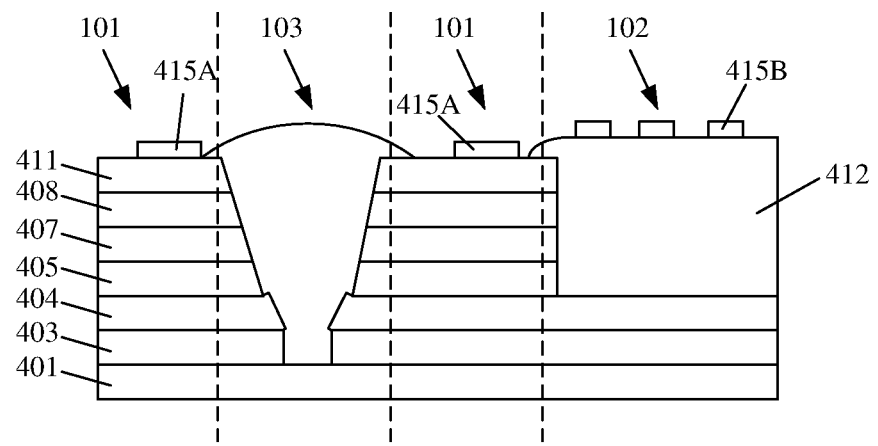
FIG. 9 is a schematic view of a display substrate in some embodiments of the present disclosure.

Referring to FIG. 9, the source and drain electrode layers 415A and the inter-island connection lines 415B are formed of the same material. Specifically, a metal material is first deposited on the display substrate, and then the metal material is formed as a metal pattern by exposure and etching to form a source/drain electrode layer 415A and an inter-island connection line 415B, where the metal pattern arranged on the pixel island 101 is formed as the source/drain electrode layer 415A, and the metal pattern on the island bridge 102 forms the inter-island connection line 415B.

Figure 10:
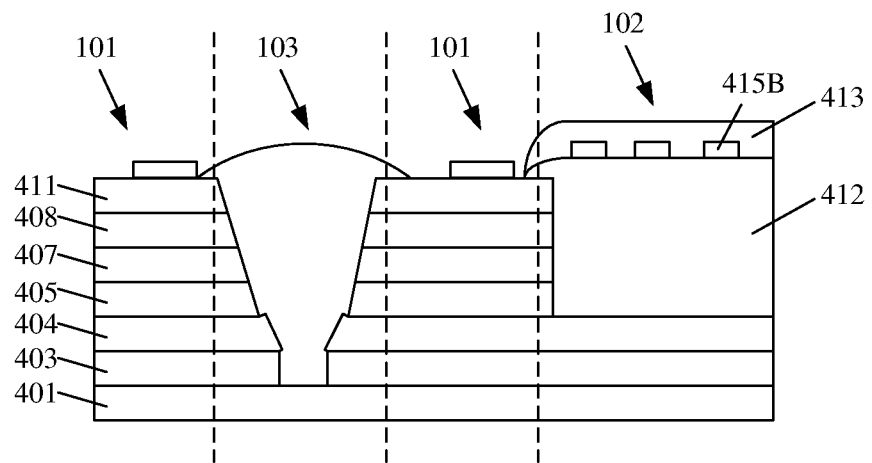
FIG. 10 is a schematic view of a display substrate in some embodiments of the present disclosure.

As shown in FIG. 10, the second planarization layer 413 is formed, the materials of the first planarization layer 412 and the second planarization layer 413 in FIG. 10 may be the same, so that the boundary between the first planarization layer 412 and the second planarization layer 413 is used only to represent their fabrication in different steps.

Figure 11:
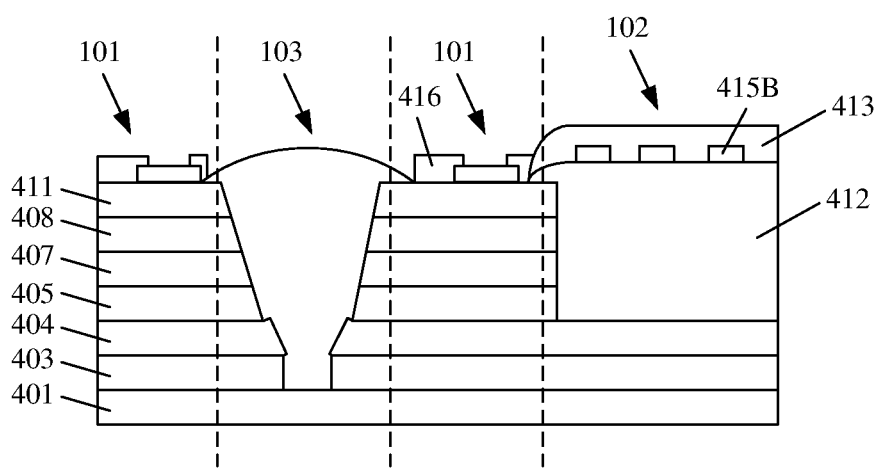
FIG. 11 is a schematic view of a display substrate in some embodiments of the present disclosure.

As shown in FIG. 11, a first protective layer 416 is then formed, which is an optional step. On the one hand, the first protective layer 416 serves as a dielectric layer of the package for improving the reliability of the source/drain electrode layer 415A, and on the other hand, the structural strength is improved by the structural design, thereby reducing the possibility of falling off.

Next, an electroluminescent unit is formed.

As shown in FIG. 4, a third planarization layer 414 may be formed before forming the electroluminescent unit, and reference may be made to the related art, which is not further defined and described herein.

Figure 12:
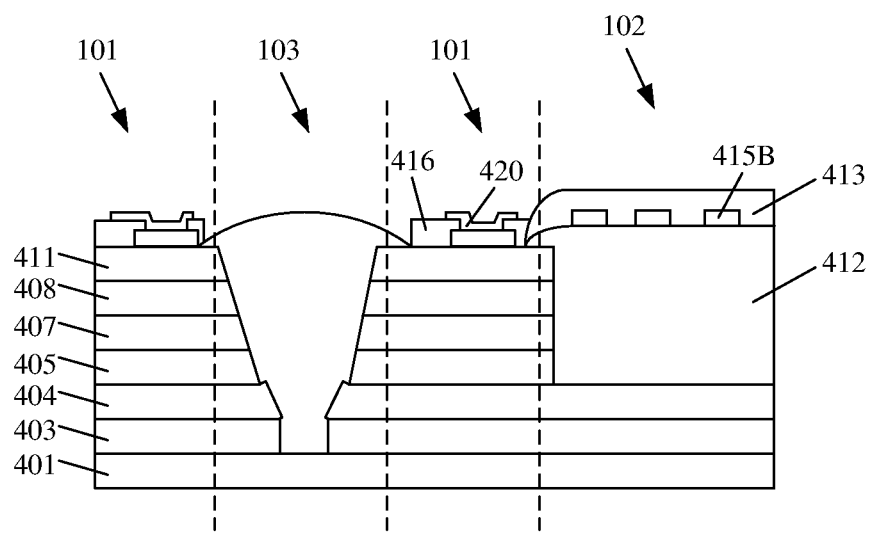
FIG. 12 is a schematic view of a display substrate in some embodiments of the present disclosure.
Figure 13:
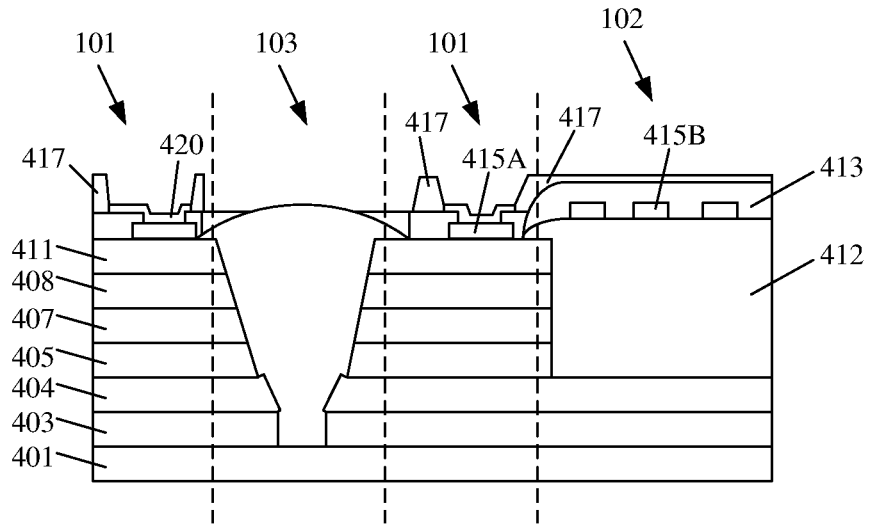
FIG. 13 is a schematic view of a display substrate in some embodiments of the present disclosure.
Figure 14:
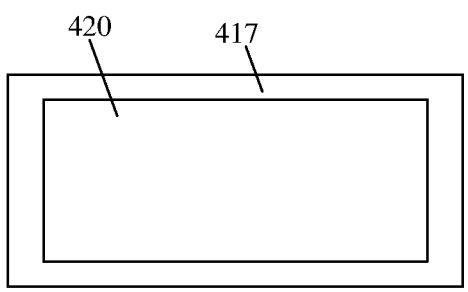
FIG. 14 is a schematic view of an anode layer and a pixel defining layer in a display substrate in some embodiments of the present disclosure.

As shown in FIG. 12, the anode layer 420 of the electroluminescent unit is first formed when forming the electroluminescent unit. As shown in FIG. 13, the pixel defining layer 417 is formed after the anode layer 420 is formed. Referring to FIG. 14, the pixel defining layer 312 is formed in a ring shape and is designed around the anode layer 420.

In some embodiments of the present disclosure, the material of the pixel defining layer 417 and the above-mentioned planarization layers should be have a low elastic modulus and a good tensile effect. In some embodiments, when the stretchability of the material of the pixel defining layer 417 and the material of the planarization layers reaches 12% or more, that is, the stretchability of the material of the pixel defining layer 417 and the material of the planarization layers reaches 12%, the material of the pixel defining layer 417 and the material of the planarization layers 417 can maintain normal elastic deformation, which contributes to improving the tensile performance of the display substrate.

Figure 15:
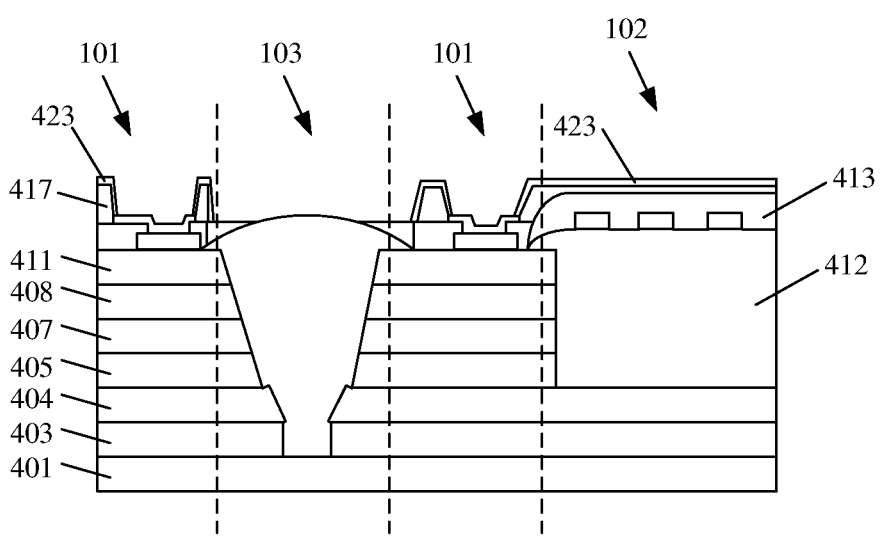
FIG. 15 is a schematic view of a display substrate in some embodiments of the present disclosure.

As shown in FIGS. 4 and 15, after the pixel definition layer is formed, a second protective layer 423 for protecting the organic material of the lower layer, such as the spacer 424, is formed to prevent the organic material from being damaged during the ashing process.

Figure 16:
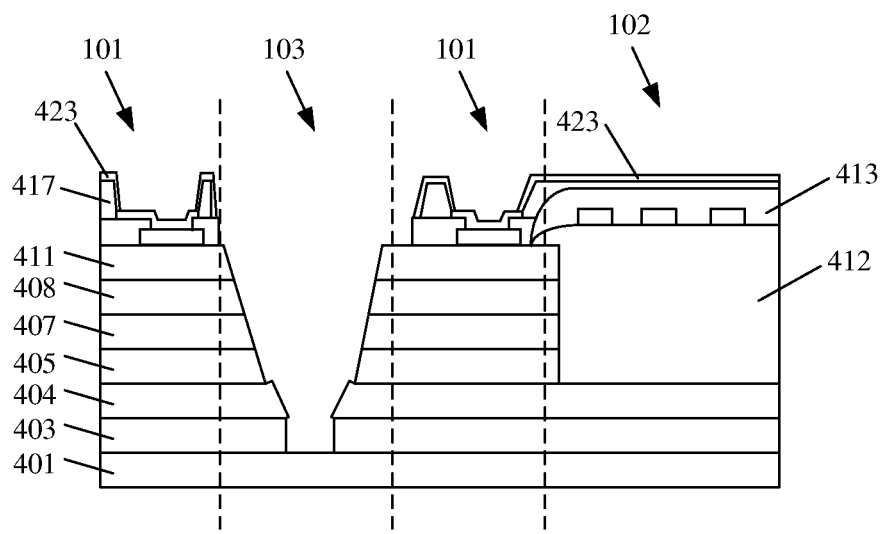
FIG. 16 is a schematic view of a display substrate in some embodiments of the present disclosure.

Next, as shown in FIG. 16, an ashing process is performed to remove the organic material in the hollow area 103, and the ashing process does not affect other areas due to the second protective layer 423, so that the ashing process can remove the organic material in the hollow area 103 without damaging the organic material in the other areas.

Next, as shown in FIG. 4, the electroluminescent layer 421 and the cathode layer (Cathode) 422 are formed, and finally, the thin film encapsulation layer 425 is encapsulated on the formed electroluminescent unit, then the display substrate is completed finally.

In the above forming process, the steps not described in detail may be referred to the related art and the improved forming method of the display substrate, and are not further limited herein. Meanwhile, the display substrate and the forming process thereof are not fixed. For example, certain modifications and adjustments can be made to the structure of the display substrate according to the type of the display substrate.

Figure 17:
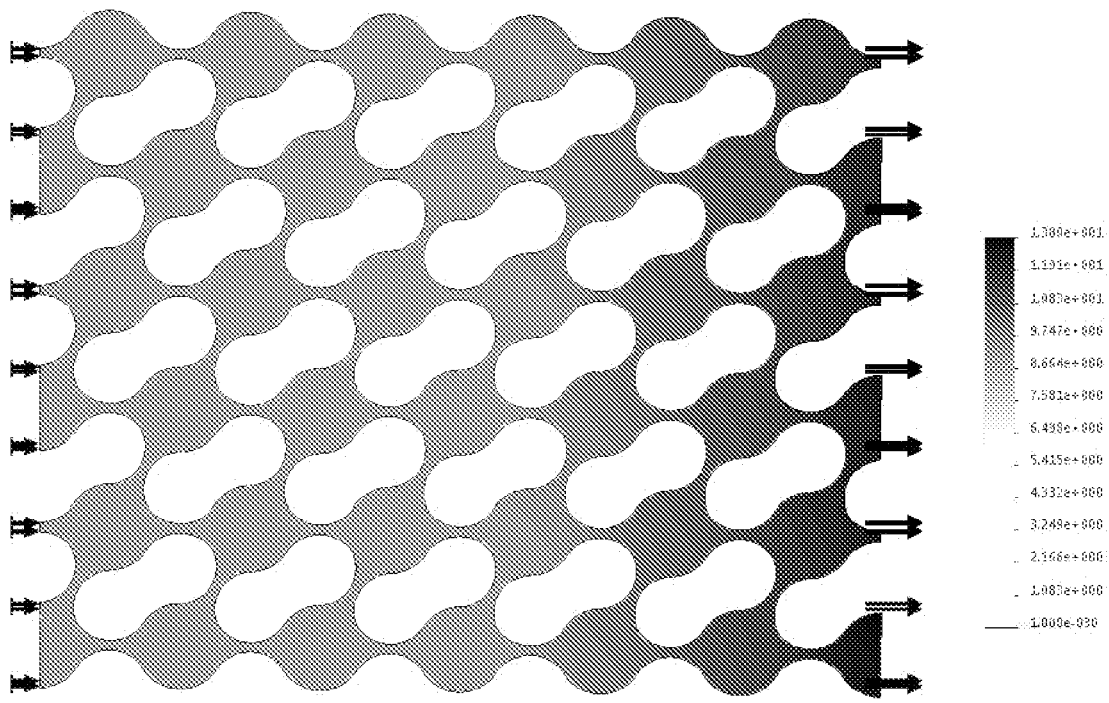
FIG. 17 is a schematic view of a simulated tensile displacement of a substrate in some embodiments of the present disclosure.
Figure 18:
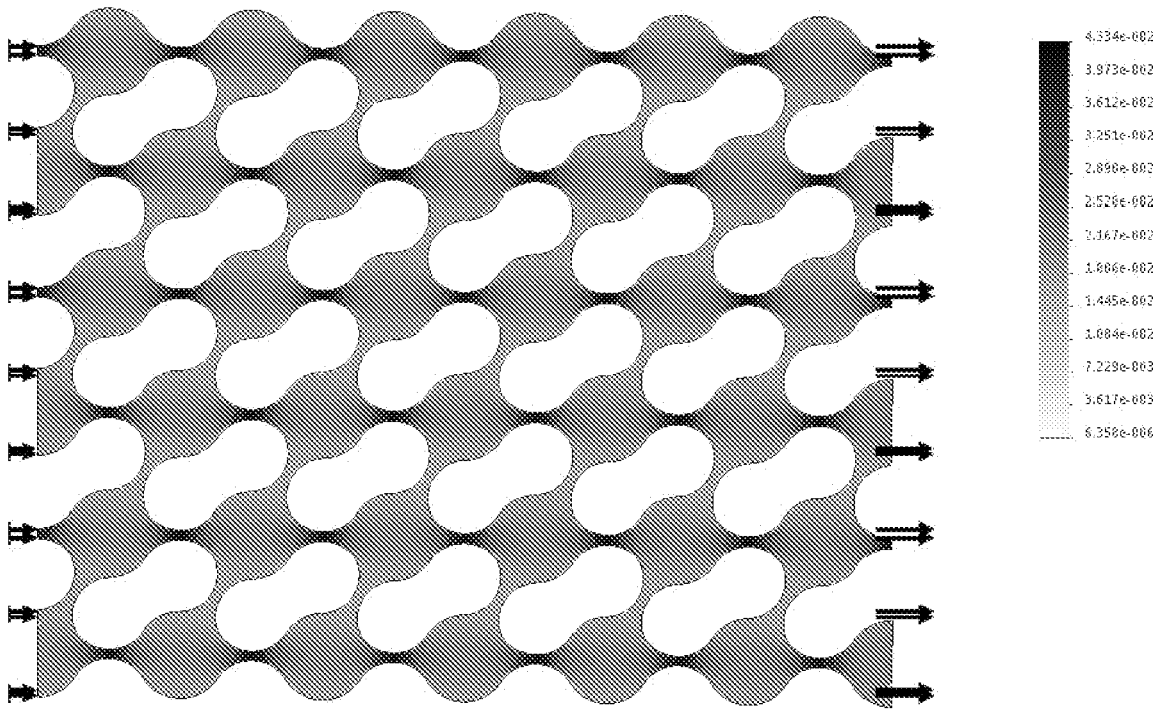
FIG. 18 is a schematic view of a simulated tensile stress of a substrate in some embodiments of the present disclosure.
Figure 19:
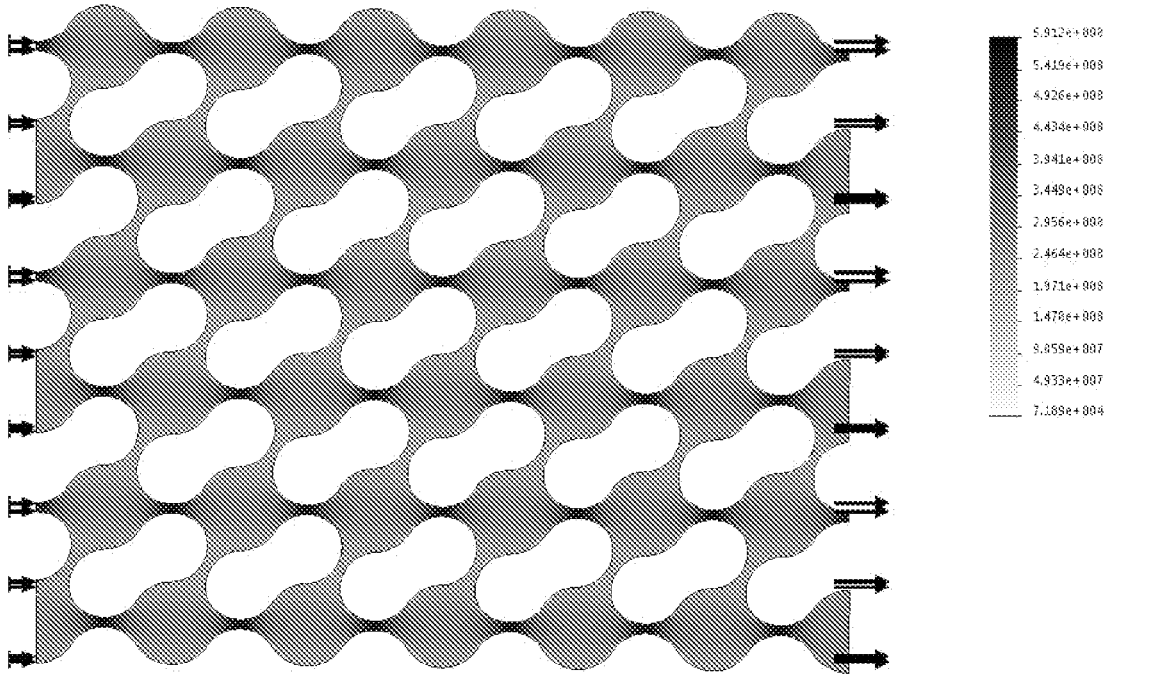
FIG. 19 is a schematic view of a simulated tensile strain of a substrate in some embodiments of the present disclosure.

Referring to FIG. 17, FIG. 18 and FIG. 19, FIG. 17, FIG. 18 and FIG. 19 are schematic diagrams of displacement, strain, and stress of a display panel in a simulated tensile test, respectively. The left arrow in the figure represents the boundary condition of the display substrate, and the right arrow represents the loading position of the display substrate. As can be seen from the figure, the left side of the display substrate is a fixed boundary, and uniform tension is applied to the right side of the display substrate.

FIG. 17 is a schematic view of the displacement of the simulated static stretching in some embodiments of the present disclosure. The unit of the legend is millimeters. As can be seen from FIG. 17, the maximum displacement is about 13 millimeters when stretched to the extreme state, which occurs on the rightmost side of the display substrate. The scale of the figure is 1:1, that is, the stretch ratio during this simulation is about 5%.

Referring to FIG. 18, which shows the strain simulation results of the substrate, the strain in the area of the island bridge 102 is relatively large, up to about 0.036, and the strain on the pixel island 101 is relatively small, up to about 0.0036, when in the extreme tension state, that is, the strain mainly occurs on the island bridge 102, and the strain generated on the pixel island 101 is relatively small, thereby reducing the possibility of damage of the display unit on the pixel island 101.

Referring to FIG. 19, FIG. 19 shows a stress simulation result of a substrate in Pascals (Pa). As can be seen from FIG. 18, in the stretched state, the stress of the substrate is mainly concentrated on the island bridge 102, and the maximum stress is about 590 MPa, while the stress on the pixel island 101 is relatively small, and the minimum stress is 49 MPa. It can be seen that in the stretched state, the stress concentration mainly occurs on the island bridge 102, and the stress concentration on the pixel island 101 is relatively weak, thereby reducing the possibility of damage to the display unit.

As can be seen from the above simulation results, the display substrate can be subjected to a certain tension, and the strain and the stress concentration mainly occur on the island bridge 102, and the stress and the strain at the pixel island 101 are relatively small, thereby reducing the possibility of damage of the display unit arranged on the pixel island 101.

The above description are merely some embodiments of the present disclosure, but the scope of the present disclosure is not limited thereto. Any variations or substitutions that may readily occur to those skilled in the art within the technical scope of the present disclosure are intended to be included within the scope of the present disclosure.

The invention claimed is:

1. A display substrate, comprising: a flexible base substrate and a plurality of pixel islands arranged on the flexible base substrate, wherein the plurality of pixel islands are arranged in an array, two adjacent pixel islands are connected through an island bridge, display units are arranged on the pixel islands, the display units on the pixel islands are electrically connected through an inter-island connection line arranged on the island bridge, a region outside the pixel islands and the island bridge is a hollow area, and axes of four island bridges around the hollow area are arranged as a parallelogram;
   wherein the display substrate further comprises:
      a barrier layer, a buffer layer, an active layer, a gate insulating layer, a gate layer and a dielectric layer on the flexible base substrate, wherein the active layer is arranged in a region corresponding to the pixel islands;
      grooves arranged in regions corresponding to the island bridges; and
      an organic material arranged in the grooves in the regions corresponding to the island bridges.

2. The display substrate according to claim 1, wherein a width of each island bridge gradually increases in a direction from a center of the island bridge toward the pixel island.

3. The display substrate according to claim 2, wherein a side edge of each island bridge is arc-shaped and connected to the pixel island in a tangential direction of the pixel island.

4. The display substrate according to claim 2, wherein two opposite ends of the island bridge are respectively connected to the two adjacent pixel islands, and the width of the island bridge gradually increases in a first direction from a center point of an axis of the island bridge toward one of the two opposite ends of the island bridge and gradually increases in a second direction from the center point of the axis of the island bridge toward the other one of the two opposite ends of the island bridge, wherein the first direction is opposite to the second direction.

5. The display substrate according to claim 1, wherein a side edge of each island bridge is arc-shaped and connected to the pixel island in a tangential direction of the pixel island.

6. The display substrate according to claim 5, wherein a central angle, corresponding to a portion of the pixel island connected to the island bridge, is 60 degrees to 80 degrees.

7. The display substrate according to claim 5, wherein a central angle, corresponding to a part of the side edge of each pixel island which is in contact with and connected to the island bridge, is 60 degrees to 80 degrees.

8. The display substrate according to claim 5, wherein ends at a side of the hollow area, of the side edges of adjacent island bridges which are in contact with and connected to each pixel island, coincide.

9. The display substrate according to claim 1, wherein in the four island bridges whose axes are arranged as the parallelogram, an included angle between the axes of two adjacent ones of the island bridges is greater than 30 degrees and less than 90 degrees, or greater than 90 degrees and less than 150 degrees.

10. The display substrate according to claim 1, wherein the inter-island connection line is arranged in a same layer as a signal line of each display unit.

11. The display substrate according to claim 1, wherein the island bridge comprises a first planarization layer and a second planarization layer arranged at a side of the first planarization layer away from the flexible base substrate, the inter-island connection line is arranged between the first planarization layer and the second planarization layer.

12. The display substrate according to claim 11, wherein an elastic modulus of the first planarization layer and an elastic modulus of the second planarization layer are both smaller than an elastic modulus of the inter-island connection line.

13. The display substrate according to claim 1, wherein axial directions of part of the island bridges are the same as an extension direction of a gate line of the display substrate or the same as an extension direction of a scanning line of the display substrate.

14. A display device comprising the display substrate according to claim 1.

15. A method of forming a display substrate, comprising:
providing a flexible base substrate;
forming a plurality of pixel islands on the flexible base substrate, and forming a plurality of island bridges on the flexible base substrate, wherein the plurality of pixel islands are arranged in an array, two adjacent pixel islands are connected through the island bridges, a region outside the pixel islands and the island bridges is a hollow area, and axes of the four island bridges surrounding the same hollow area are arranged as a parallelogram; and
forming display units on the pixel islands, and forming an inter-island connection line on each island bridge, wherein the display units are electrically connected to each other through the inter-island connection line;
wherein the forming the plurality of pixel islands on the flexible base substrate and forming the plurality of island bridges on the flexible base substrate further comprises:
forming a barrier layer, a buffer layer, an active layer, a gate insulating layer, a gate layer and a dielectric layer on the flexible base substrate, wherein the active layer is arranged in a region corresponding to the pixel islands;
forming grooves in regions corresponding to the island bridges and the hollow area; and
filling, with an organic material, the grooves in the regions corresponding to the island bridges.

16. The method according to claim 15, wherein the forming the grooves in the regions corresponding to the island bridges and the hollow area further comprises:
forming first grooves in the regions corresponding to the island bridges and the hollow area, wherein the first grooves extend from the dielectric layer to the barrier layer;
forming a second groove in the region corresponding to the hollow area, wherein the second groove extends from the barrier layer to a surface of the flexible base substrate.

17. The method according to claim 15, wherein each display unit comprises a signal line, the forming the display units on the pixel islands and forming the inter-island connection line on each island bridge further comprises:
forming the signal line on each pixel island and the inter-island connection line on each island bridge by one patterning process.

18. A display substrate, comprising: a flexible base substrate and a plurality of pixel islands arranged on the flexible base substrate, wherein the plurality of pixel islands are arranged in an array, two adjacent pixel islands are connected through an island bridge, display units are arranged on the pixel islands, the display units on the pixel islands are electrically connected through an inter-island connection line arranged on the island bridge, a region outside the pixel islands and the island bridge is a hollow area, and axes of four island bridges around the hollow area are arranged as a parallelogram;
wherein in the four island bridges whose axes are arranged as the parallelogram, an included angle between the axes of two adjacent ones of the island bridges is greater than 30 degrees and less than 90 degrees, or greater than 90 degrees and less than 150 degrees.

* * * * *